(12) United States Patent
Price et al.

(10) Patent No.: US 10,893,197 B2
(45) Date of Patent: *Jan. 12, 2021

(54) PASSIVE AND ACTIVE STEREO VISION 3D SENSORS WITH VARIABLE FOCAL LENGTH LENSES

(71) Applicant: Microsoft Technology Licensing, LLC, Redmond, WA (US)

(72) Inventors: Raymond Kirk Price, Redmond, WA (US); Denis Demandolx, Bellevue, WA (US); Michael Bleyer, Seattle, WA (US); Jian Zhao, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/725,908

(22) Filed: Dec. 23, 2019

(65) Prior Publication Data

US 2020/0137306 A1    Apr. 30, 2020

Related U.S. Application Data

(62) Division of application No. 15/371,097, filed on Dec. 6, 2016, now Pat. No. 10,554,881.

(51) Int. Cl.
| | | |
|---|---|---|
| *G06T 7/10* | (2017.01) | |
| *H04N 13/243* | (2018.01) | |
| *H04N 5/232* | (2006.01) | |
| *H04N 7/18* | (2006.01) | |
| *H04N 13/254* | (2018.01) | |
| *G06K 7/10* | (2006.01) | |
| *G02B 5/02* | (2006.01) | |
| *G02B 19/00* | (2006.01) | |
| *B64C 39/02* | (2006.01) | |

(52) U.S. Cl.
CPC ....... *H04N 5/23238* (2013.01); *G02B 5/0278* (2013.01); *G02B 19/009* (2013.01); *G02B 19/0014* (2013.01); *G02B 19/0047* (2013.01); *G02B 19/0076* (2013.01); *G06K 7/10554* (2013.01); *G06K 7/10633* (2013.01); *H04N 7/181* (2013.01); *H04N 7/188* (2013.01); *H04N 13/243* (2018.05); *H04N 13/254* (2018.05); *B64C 39/024* (2013.01); *G02B 5/021* (2013.01)

(58) Field of Classification Search
CPC .... H04N 5/23238; H04N 13/30; H04N 13/32; H04N 13/254; G06K 7/10
See application file for complete search history.

(56) References Cited

U.S. PATENT DOCUMENTS 6,690,451 B1 *  2/2004  Schubert ................ G01C 11/06
                                                              356/3.14
10,089,737 B2 * 10/2018  Krieger ................. H04N 13/204
(Continued)

OTHER PUBLICATIONS

NPL Google Search; 2020 (Year: 2020).*
(Continued)

*Primary Examiner* — Luis Perez-Fuentes
(74) *Attorney, Agent, or Firm* — Ray Quinney & Nebeker P.C.; John O. Carpenter

(57) ABSTRACT

A stereoscopic 3D imaging system includes multiple imaging sensors with adjustable optics. The adjustable optics are variable to alter the FOV of each of the multiple imaging sensors to improve angular resolution of the imaging system.

20 Claims, 9 Drawing Sheets

(56) References Cited

U.S. PATENT DOCUMENTS

| | | | |
|---|---|---|---|
| 10,097,813 B2* | 10/2018 | Stenger | H04N 13/25 |
| 10,554,881 B2* | 2/2020 | Price | G06K 7/10633 |
| 2007/0296809 A1* | 12/2007 | Newbery | H04N 13/344 |
| | | | 348/42 |
| 2012/0056982 A1* | 3/2012 | Katz | G06T 7/521 |
| | | | 348/43 |
| 2012/0200693 A1 | 8/2012 | Lippert et al. | |
| 2016/0182789 A1* | 6/2016 | Wan | G01S 17/894 |
| | | | 348/370 |
| 2017/0171541 A1 | 6/2017 | Shih et al. | |
| 2018/0160101 A1* | 6/2018 | Price | H04N 13/271 |
| 2020/0053291 A1 | 2/2020 | Price et al. | |
| 2020/0137306 A1* | 4/2020 | Price | G02B 19/0076 |

OTHER PUBLICATIONS

NPL Google Search log; (Year: 2020).*
Active, optical range imaging sensors; 1988; P. Bels et al; (Year: 1988).*
Photometric method for determining surface orientation from multiple images; Woodham; 1980. (Year: 1998).*
Efficiently Combining Positions and Normal for Precise 3D Geometry; Nehab; 2005. (Year: 2005).*
Non-rigid Photometric Stereo with Colored Lights; Hernandez; 2007. (Year: 2007).*
Dynamic Shape Capture using Multi-View Photometric Stereo; Vlasic; 2009. (Year: 2009).*
High-detail 3D capture of facial performance; Klaudiny; 2010. (Year: 2010).*
"Non Final Office Action Issued in U.S. Appl. No. 15/371,073", dated Jan. 27, 2020, 29 Pages.

* cited by examiner

PASSIVE AND ACTIVE STEREO VISION 3D SENSORS WITH VARIABLE FOCAL LENGTH LENSES

CROSS-REFERENCE TO RELATED APPLICATIONS

This application is a divisional of U.S. patent application Ser. No. 15/371,097, filed Dec. 6, 2016, which is hereby incorporated by reference in its entirety.

BACKGROUND

Background and Relevant Art

Three-dimensional (3D) imaging systems use configured to identify and map a target based on light that is reflected from the target. Many of these imaging systems are configured with a light source that is configured to emit light towards the target a photoreceptor to receive the light after it is reflected back from the target.

Some imaging systems (i.e., time-of-flight imaging systems) are capable of identifying the distances and positions of objects within a target environment at any given time by measuring the elapsed time between the emission of light from the light source and the reception of the light that is reflected off of the objects.

Other imaging systems (e.g., structured light systems) measure the distortion or displacement of light patterns to measure the shapes, surfaces and distances of the target objects. For instance, light may be emitted as a structured pattern, such as a grid pattern, dot pattern, line pattern, etc., towards the target environment. Then, the photoreceptor receives light that is reflected back from the target objects which is also patterned and which is correlated against the known initial pattern to calculate the distances, shapes, and positions of the objects in the target environment.

However, contamination of ambient light in the reflected light/images can degrade the 3D imaging quality. For example, objects that are far away can reflect light at a much lower intensity than close objects. Additionally, brightly illuminated environments, such as outdoor environments during daylight, can also introduce noise through ambient light.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some embodiments, a device for three-dimensional imaging includes a plurality of imaging sensors. Each imaging sensor of the plurality having one or more movable imaging lenses positioned proximate an input of the imaging sensor, the one or more movable imaging lenses configured to vary a field of view of the imaging sensor.

In other embodiments, a device for three-dimensional imaging includes an illuminator and a plurality of imaging sensors. The illuminator includes one or more movable illuminator lenses. The one or more movable illuminator lenses configured to vary a field of illumination of the illuminator. Each imaging sensor of the plurality having one or more movable imaging lenses positioned proximate an input of the imaging sensor, the one or more movable imaging lenses configured to vary a field of view of the imaging sensor. Each imaging sensor also includes a bandpass filter positioned proximate the input of the imaging sensor.

In yet other embodiments, a method of three-dimensional imaging includes receiving a trigger command, changing a field of view of a first imaging sensor and a second imaging sensor, detecting a reflected light with the first imaging sensor and the second imaging sensor, and measuring a depth value by comparing information from the first imaging sensor and the second imaging sensor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that these drawings depict only typical embodiments and are not therefore to be considered to be limiting in scope, embodiments will be described and explained with additional specificity and detail through the use of the accompanying drawings in which:

FIG. 5-1 is a schematic representation of a TOF illuminator with adjustable illumination optics;

FIG. 5-2 is a schematic representation of an imaging sensor with adjustable imaging optics;

DETAILED DESCRIPTION

Disclosed embodiments include improved imaging systems, as well as devices, systems, and methods for improving efficiency and resolution in three-dimensional (3D) imaging.

With regard to the following disclosure, it will be appreciated that in the development of the disclosed embodiment(s), as in any engineering or design project, numerous embodiment-specific decisions will be made to achieve the developers' specific goals, such as compliance with system-related and business-related constraints, which may vary from one embodiment to another. It will further be appreciated that such a development effort might be complex and time consuming, but would nevertheless be a routine undertaking of design, fabrication, and manufacture for those of ordinary skill having the benefit of this disclosure.

In some embodiments, the accuracy by which a target and/or an environment may be imaged with a 3D imaging system may be at least partially related to ratio of reflected light (light emitted from the imaging system and reflected back to the imaging system) and ambient light captured by imaging system. The reflected light captured may be increased by increasing the intensity or by altering the field of illumination of the emitted light. In other embodiments, the accuracy by which a target and/or an environment may be imaged with a 3D imaging system may be at least partially related to the angular resolution with which the reflected light is collected and the accuracy with which the position of visual features may be recognized.

In some embodiments, a 3D imaging system may include one or more lenses to allow adjustment of a field of illumination of one or more illuminators and/or a field of view of one or more imaging sensors. For example, a 3D imaging system may include an illuminator with an adjustable focal length and an imaging sensor with an adjustable focal length. Altering the focal length of the illuminator and/or the imaging sensor may change the angular resolution of the 3D imaging system. In some embodiments, the 3D imaging system may broaden a field of illumination and/or view to allow tracking of objects within a larger area close to the 3D imaging system. In other embodiments, the 3D imaging system may narrow a field of illumination and/or view to increase angular resolution at longer distances to more precisely identify and/or track features at longer distances.

Figure 1:
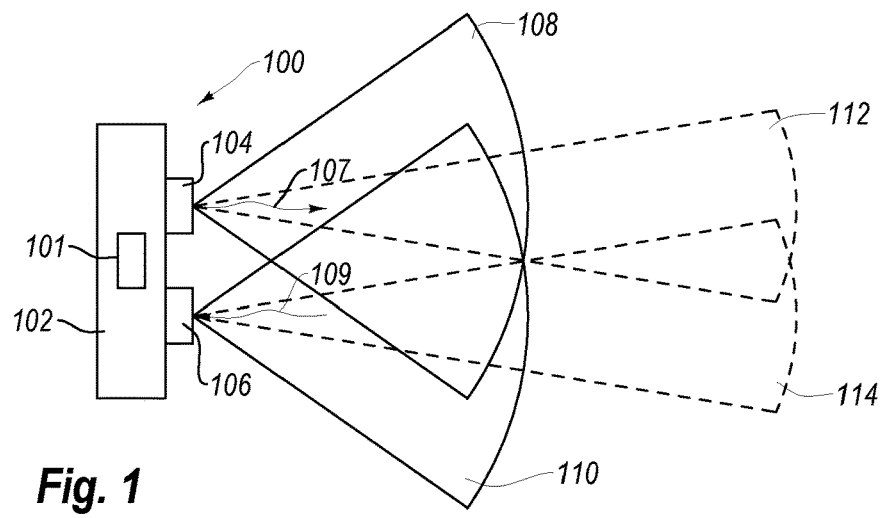
FIG. 1 is a schematic representation of a three-dimensional (3D) time-of-flight (TOF) imaging system having adjustable illuminator and imaging optics.

FIG. 1 illustrates a 3D imaging system 100 including a housing 102 that supports an illuminator 104 and an imaging sensor 106. The illuminator 104 and imaging sensor 106 are in data communication with a processor 101. In some embodiments, the illuminator 104 is a modulated illuminator and the processor 101 may be a time-of-flight measurement device. For example, the illuminator 104 may emit an output light 107 that is modulated over time. In some embodiments, the output light 107 is modulated by frequency over time. In other embodiments, the output light 107 is modulated by intensity over time. In yet other embodiments, the output light 107 is modulated by other values of the output light 107, such as a pulse duration. The imaging sensor 106 has a coordinated shutter that operates in conjunction with the light modulation, allowing the time of flight depth measurement.

In some embodiments, the illuminator 104 provides an output light 107 in a first wavelength range. For example, the first wavelength range may be in the infrared wavelength range. In other examples, the first wavelength range may be in the ultraviolet range. In yet other examples, the first wavelength range may be in the visible wavelength range. In some embodiments, the first wavelength range has a maximum intensity in a range having an upper value, a lower value, or upper and lower values including any of 800 nanometers (nm), 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1000 nm, or any values therebetween. For example, the first wavelength range may have a maximum intensity greater than 800 nm. In other examples, the first wavelength range may have a maximum intensity less than 1000 nm. In yet other examples, the first wavelength range may have a maximum intensity between 800 nm and 1000 nm. In further examples, the first wavelength range may have a maximum intensity between 825 nm and 875 nm. In at least one example, the first wavelength range may have a maximum intensity about 850 nm.

The imaging sensor 106 is oriented to receive input light 109 that includes at least a portion of the output light 107 reflected from a target or object in the environment around the 3D imaging system 100. For example, the illuminator 104 and imaging sensor 106 are oriented with substantially parallel axes. In other embodiments, the illuminator 104 and imaging sensor 106 may be oriented with convergent axes or divergent axes. For example, the illuminator 104 and imaging sensor 106 may be oriented with axes that converge at a predetermined distance from the 3D imaging system 100. Convergence axes of the illuminator 104 and imaging sensor 106 may allow for increased performance at intended or expected operating distances. For example, a 3D imaging system integrated with a head mounted display may be configured to have convergent axes that converge at or near a user's arm length for hand gesture recognition.

In some embodiments, the imaging sensor 106 includes one or more photoreceptors. For example, the imaging sensor 106 may include an array of photoreceptors to capture an image of an illuminated target or object in the environment. The photoreceptors may be configured to receive and detect input light 109 including at least a portion of the output light 107 reflected toward the imaging sensor 106. In some embodiments, the imaging sensor 106 is configured to receive and detect input light 109 in the first wavelength range.

The housing 102 may be a standalone housing or integrated into another device or system. In some embodiments, the housing 102 is a wearable device, such as a head mounted display. In other embodiments, the housing 102 is part of another device, such as a vehicle. For example, the 3D imaging system 100 may be integrated into a motorized or non-motorized vehicle (such as an automobile, an aerial vehicle, a bicycle, a motorcycle, a wheelchair, etc.) to provide 3D imaging system 100 in a mobile environment. In some examples, the 3D imaging system 100 may be integrated into an automobile, such as in the front bumper, to detect pedestrians, animals, or other road hazards the automobile may encounter. A 3D imaging system 100 according to the present disclosure may allow for long-range 3D sensing for high-speed highway applications, while allowing for improved wide-angle 3D sensing for low-speed residential or parking lot applications with the same 3D imaging system 100. In other examples, the 3D imaging system 100 may be integrated into aerial vehicles, such as drones, for long-range high altitude 3D sensing, while allowing for improved wide-angle 3D sensing for navigating confined spaces.

The illuminator 104 may include one or more illuminator lenses for altering the field of illumination (FOI) of the illuminator 104. In some embodiments, one or more illuminator lens is positioned proximate an output of the illuminator 104 and movable relative to a light source to change a focal length of the illuminator 104. For example, the illuminator 104 may have a short throw FOI 108 and a long throw FOI 112. The short throw FOI 108 may provide a wider FOI with lower illumination concentration for a given light source intensity. The lower illumination concentration may limit the effective range of the illuminator while operating in the short throw FOI 108.

The long throw FOI 112 provides greater illumination concentration for a given light source intensity compared to the short throw FOI 108. The long throw FOI 112, therefore, may allow for the 3D imaging system to selectively increase illumination on distance objects. Increased illumination concentration may allow the 3D imaging system 100 to increase the illumination range and/or allow the 3D imaging system 100 to illuminate objects in higher amounts of ambient light. For example, the illuminator 104 may operate in a long throw FOI 112 when the 3D imaging system 100 is used outdoors in sunlight.

To operate outdoors in sunlight, the 3D imaging system 100 must generate light that is detectable over the ambient light. The illuminator 304, therefore, may generate output light with intensity sufficient to provide detectability in sunlight by the imaging sensor. For example, the illuminator 304 may generate output light at a pulsed rate of 10 Watts per meter squared or greater. In other examples, the illuminator 304 may generate output light at a pulsed rate of 50 Watts per meter squared or greater. In a structured light illuminator example, the illuminator may provide peak intensity values within the FOI (e.g., at nodes of the structured light) of 10 Watts per meter squared or greater in pulsed operation. In other structured light illuminator examples, the illuminator may provide peak intensity values within the FOI of 50 Watts per meter squared or greater in pulsed operation.

When the imaging sensor includes a bandpass filter, such as an IR filter, the illumination intensity is relative to the ambient intensity in the range that is transmitted through the bandpass filter. For example, full direct sunlight is about 100-150 klux, where 1 klux is 1.168 μW/(cm$^2$*nm). In some embodiments, the illuminator 304 provides sufficient illumination to be detectable over the sunlight in the range of light transmitted to the imaging sensor.

The illumination concentration increases relative to the angle of the FOI. The surface at the projected end of the FOI may be considered as having a spherical cap. The surface area of a spherical cap is:

$$A = 2\pi r^2 (1-\cos\theta)$$

Where theta is the angle subtending a spherical cap of radius r. Depth performance is at least partially defined by the radial depth. The radial power density may be increased by reducing the field of illumination and field of view to concentrate the output light, or by increasing the illumination intensity, by increasing the actively illuminated exposure time, or combinations thereof.

The imaging sensor 106 may include one or more imaging lenses to alter a field of view (FOV) of the imaging sensor 106. In some embodiments, one or more imaging lenses is positioned proximate an input of the imaging sensor 106 and movable relative to one or more photoreceptors to change an effective focal length of the imaging lens. For example, the imaging sensor 106 may have a short throw FOV 110 and a long throw FOV 114. The short throw FOV 110 may provide a wider FOV to track nearby objects in the environment around the 3D imaging system 100.

The long throw FOV 114 provides smaller angular resolution to identify and track objects at longer distances than the short throw FOV 114. The long throw FOV 114 therefore, may allow for the 3D imaging system to increase imaging resolution depending on task. The imaging sensor 106 has a photoreceptor array with a fixed pixel resolution. By decreasing the FOV of the imaging sensor 106 in the long throw FOV 114, each pixel of the photoreceptor array may receive a smaller angular arc of the input light 109, increasing the resolution of the imaging sensor 106 on the center of the FOV.

Figure 2:
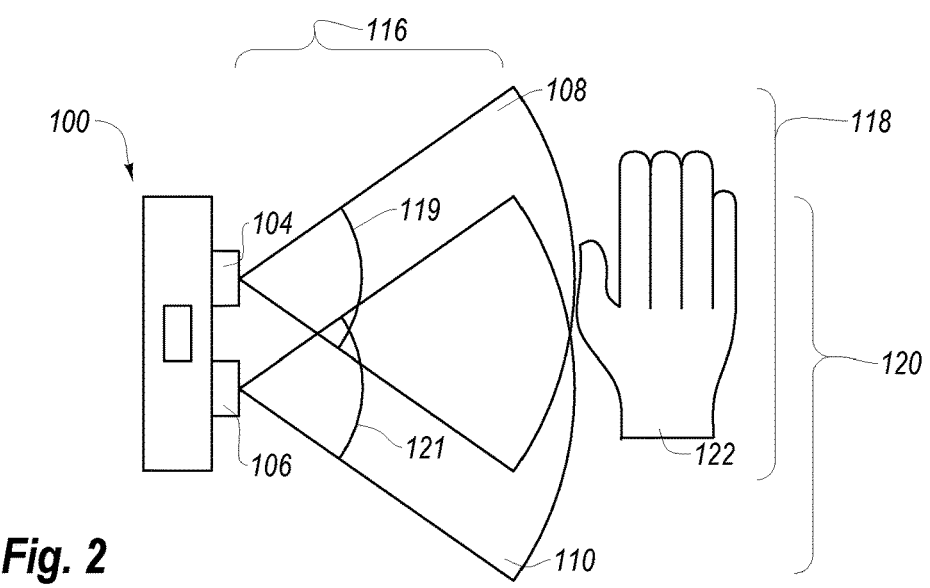
FIG. 2 is a schematic representation of the 3D TOF imaging system of FIG. 1 in a short throw imaging mode.

FIG. 2 illustrates the 3D imaging system 100 of FIG. 1 in a short-range application. The 3D imaging system 100 may operate in a short range application when identifying and/or tracking objects 122 that are relatively close to the illuminator 104 and/or imaging sensor 106. In some embodiments, the illuminator 104 and/or imaging sensor 106 are configured to identify or track a close object 122 that is a first distance 116 from the illuminator 104 and/or imaging sensor 106. In some embodiments, the first distance 116 is in a range having an upper value, a lower value, or an upper and lower value including any of 15 centimeters (cm), 30 cm, 60 cm, 1.0 meters (m), 1.5 m, 2.0 m, 3.0 m, 5.0 m, or any values therebetween. For example, the first distance 116 may be greater than 15 cm. In other examples, the first distance 116 may be less than 5.0 m. In yet other examples, the first distance 116 may be between 15 cm and 5.0 m. In further examples, the first distance 116 may be between 30 cm and 3.0 m. In at least one example, the first distance 116 may be between 60 cm and 2.0 m.

In some embodiments, the short throw FOI 108 is substantially conical, matching the FOV of the camera system. In other embodiments, the short throw FOI 108 is hexagonal, square, or rectangular. For example, the illuminator 104 may emit light that is projected in an approximate rectangle. At the first distance 116, the short throw FOI 108 may have a short throw FOI width 118 that is at least partially related to a short throw FOI angle 119. In some embodiments, the short throw FOI width 118 is in a range having an upper value, a lower value, or an upper and lower value including any of 30 cm, 60 cm, 1.0 m, 1.5 m, 2.0 m, 3.0 m, 5.0 m, 10 m, or any values therebetween. For example, the short throw FOI width 118 may be greater than 30 cm. In other examples, the short throw FOI width 118 may be less than 10 m. In yet other examples, the short throw FOI width 118 may be between 30 cm and 10 m. In further examples, the short throw FOI width 118 may be between 60 cm and 5.0 m. In at least one example, the short throw FOI width 118 may be between 1.0 m and 3.0 m.

In some embodiments, the short throw FOI angle 119 is in a range having an upper value, a lower value, or upper and lower values including any of 60°, 70°, 80°, 90°, 100°, 110°, 120°, 130°, 140°, 150°, or any values therebetween. For example, the short throw FOI angle 119 may be greater than 60°. In other examples, the short throw FOI angle 119 may be less than 150°. In yet other examples, the short throw FOI angle 119 may be between 60° and 150°.

The imaging sensor 106 may have a short throw FOV 110. In some embodiments, the short throw FOV 110 is substantially equivalent to the short throw FOI 108. In other embodiments, the short throw FOV 110 is independent of the short throw FOI 108.

In some embodiments, the short throw FOV 110 is substantially conical. In other embodiments, the short throw FOV 110 is hexagonal, square, or rectangular. At the first distance 116, the short throw FOV 110 may have a short throw FOV width 120 that is at least partially related to a short throw FOV angle 121. In some embodiments, the short throw FOV width 120 is in a range having an upper value, a lower value, or an upper and lower value including any of 30 cm, 60 cm, 1.0 m, 1.5 m, 2.0 m, 3.0 m, 5.0 m, 10 m, or any values therebetween. For example, the short throw FOV width 120 may be greater than 30 cm. In other examples, the short throw FOV width 120 may be less than 10 m. In yet other examples, the short throw FOV width 120 may be between 30 cm and 10 m. In further examples, the short throw FOV width 120 may be between 60 cm and 5.0 m. In at least one example, the short throw FOV width 120 may be between 1.0 m and 3.0 m.

In some embodiments, the short throw FOV angle 121 is in a range having an upper value, a lower value, or upper and lower values including any of 60°, 70°, 80°, 90°, 100°, 110°, 120°, 130°, 140°, 150°, or any values therebetween. For example, the short throw FOV angle 121 may be greater than 60°. In other examples, the short throw FOV angle 121 may be less than 150°. In yet other examples, the short throw FOV angle 121 may be between 60° and 150°.

At the first distance 116, the short throw FOI 108 and the short throw FOV 110 overlap. In some embodiments, at the first distance 116, the short throw FOI 108 and the short throw FOV 110 overlap by at least 50%, at least 60%, at least 70%, at least 80%, at least 90%, at least 95%, or any values therebetween.

Figure 3:
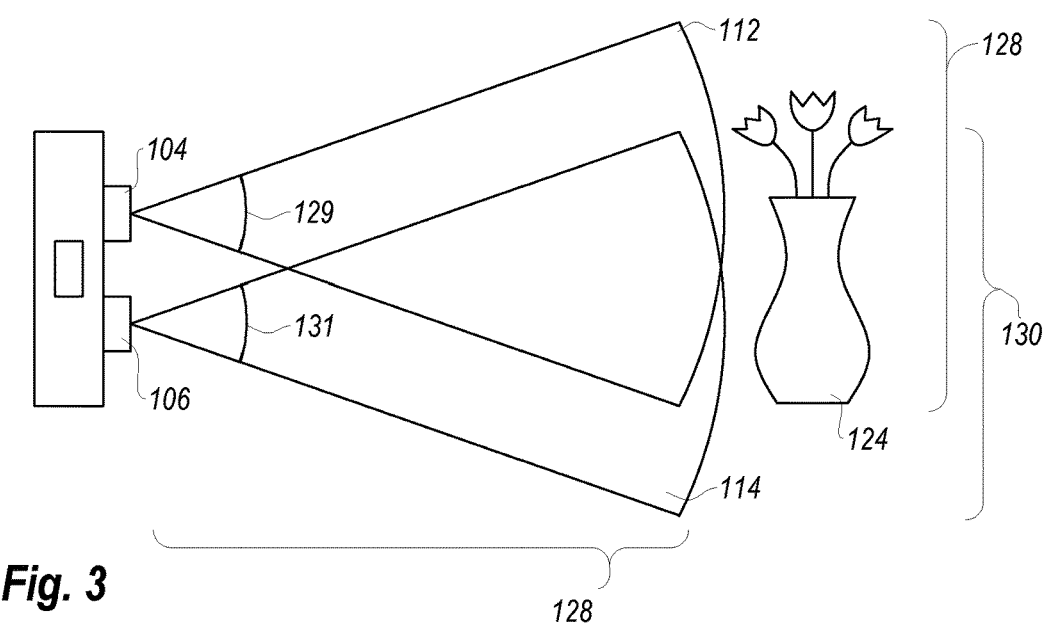
FIG. 3 is a schematic representation of the 3D TOF imaging system of FIG. 1 in a long throw imaging mode.

The FOI and the FOV of the 3D imaging system 100 may be continuously variable between the short throw FOI 108 and/or FOV 110 and a long throw FOI 112 and long throw FOV 114, shown in FIG. 3. One or more illuminator lenses in the illuminator 104 may move to alter the FOI to the long throw FOI 112. In some embodiments, the one or more illuminator lenses in the illuminator 104 are moved by a piezoelectric motor, by stepper motor, or by other mechanical or electromechanical motor.

The 3D imaging system 100 may operate in a long range application when identifying and/or tracking objects 124 that are relatively far from the illuminator 104 and/or imaging sensor 106. In some embodiments, the illuminator 104 and/or imaging sensor 106 are configured to identify or track a distant object 124 that is a second distance 126 from the illuminator 104 and/or imaging sensor 106. In some embodiments, the second distance 126 is in a range having an upper value, a lower value, or an upper and lower value including any of 1.0 m, 2.0 m, 3.0 m, 5.0 m, 7.0 m, 9.0 m, 12.0 m, 15.0 m, or any values therebetween. For example, the second distance 126 may be greater than 1.0 m. In other examples, the second distance 126 may be less than 15.0 m. In yet other examples, the second distance 126 may be between 1.0 m and 15.0 m. In further examples, the second distance 126 may be between 2.0 and 12.0 m. In at least one example, the second distance 126 may be about 3.0 m.

In some embodiments, the long throw FOI 112 is substantially conical. In other embodiments, the long throw FOI 112 is hexagonal, square, or rectangular. For example, the illuminator 104 may emit light that is projected in an approximate rectangle. At the second distance 126, the long throw FOI 112 may have a long throw FOI width 128 that is at least partially related to a long throw FOI angle 129. In some embodiments, the long throw FOI width 128 is in a range having an upper value, a lower value, or an upper and lower value including any of 30 cm, 60 cm, 1.0 m, 1.5 m, 2.0 m, 3.0 m, 5.0 m, 10 m, or any values therebetween. For example, the long throw FOI width 128 may be greater than 30 cm. In other examples, the long throw FOI width 128 may be less than 10 m. In yet other examples, the long throw FOI width 128 may be between 30 cm and 10 m. In further examples, the long throw FOI width 128 may be between 60 cm and 5.0 m. In at least one example, the long throw FOI width 128 may be between 1.0 m and 3.0 m.

In some embodiments, the long throw FOI angle 129 is in a range having an upper value, a lower value, or upper and lower values including any of 5°, 10°, 20°, 30°, 40°, 50°, 60°, 70°, 80°, 90°, or any values therebetween. For example, the long throw FOI angle 129 may be greater than 5°. In other examples, the long throw FOI angle 129 may be less than 90°. In yet other examples, the long throw FOI angle 129 may be between 5° and 90°.

In some embodiments, the illuminator 104 has a range of FOI (e.g., from the short throw FOI angle 119 to the long throw FOI angle 129) in a range having an upper value, a lower value, or upper and lower values including any of 10°, 20°, 30°, 40°, 50°, 60°, 70°, 80°, 90°, 100°, 110°, 120°, or any values therebetween. For example, the FOI range may be greater than a 10° range. In other examples, the FOI range may be less than a 120° range. In yet other examples, the FOI range may be between a 10° range and a 120° range. In at least one example, the FOI range is a 120° range.

The imaging sensor 106 may have a long throw FOV 114. In some embodiments, the long throw FOV 114 is substantially equivalent to the long throw FOI 112. In other embodiments, the long throw FOV 114 is independent of the long throw FOI 112.

In some embodiments, the long throw FOV 114 is substantially conical. In other embodiments, the long throw FOV 114 is pyramidal. At the second distance 126, the long throw FOV 114 may have a long throw FOV width 130 that is at least partially related to a long throw FOV angle 131. In some embodiments, the long throw FOV width 130 is in a range having an upper value, a lower value, or an upper and lower value including any of 30 cm, 60 cm, 1.0 m, 1.5 m, 2.0 m, 3.0 m, 5.0 m, 10 m, or any values therebetween. For example, the long throw FOV width 130 may be greater than 30 cm. In other examples, the long throw FOV width 130 may be less than 10 m. In yet other examples, the long throw FOV width 130 may be between 30 cm and 10 m. In further examples, the long throw FOV width 130 may be between 60 cm and 5.0 m. In at least one example, the long throw FOV width 130 may be between 1.0 m and 3.0 m.

In some embodiments, the long throw FOV angle 131 is in a range having an upper value, a lower value, or upper and lower values including any of 5°, 10°, 20°, 30°, 40°, 50°, 60°, 70°, 80°, 90°, or any values therebetween. For example, the long throw FOV angle 131 may be greater than 5°. In other examples, the long throw FOV angle 131 may be less than 90°. In yet other examples, the long throw FOV angle 131 may be between 5° and 90°.

In some embodiments, the imaging sensor 106 has a range of FOV (e.g., from the short throw FOV angle 121 to the long throw FOV angle 131) in a range having an upper value, a lower value, or upper and lower values including any of 10°, 20°, 30°, 40°, 50°, 60°, 70°, 80°, 90°, 100°, 110°, 120°, or any values therebetween. For example, the FOV range may be greater than a 10° range. In other examples, the FOV range may be less than a 120° range. In yet other examples, the FOV range may be between a 10° range and a 120° range. In at least one example, the FOV range is a 120° range.

At the second distance 126, the long throw FOI 112 and the long throw FOV 114 overlap. In some embodiments, at the second distance 126, the long throw FOI 112 and the long throw FOV 114 overlap by at least 50%, at least 60%, at least 70%, at least 80%, at least 90%, at least 95%, or any values therebetween.

Figure 4:
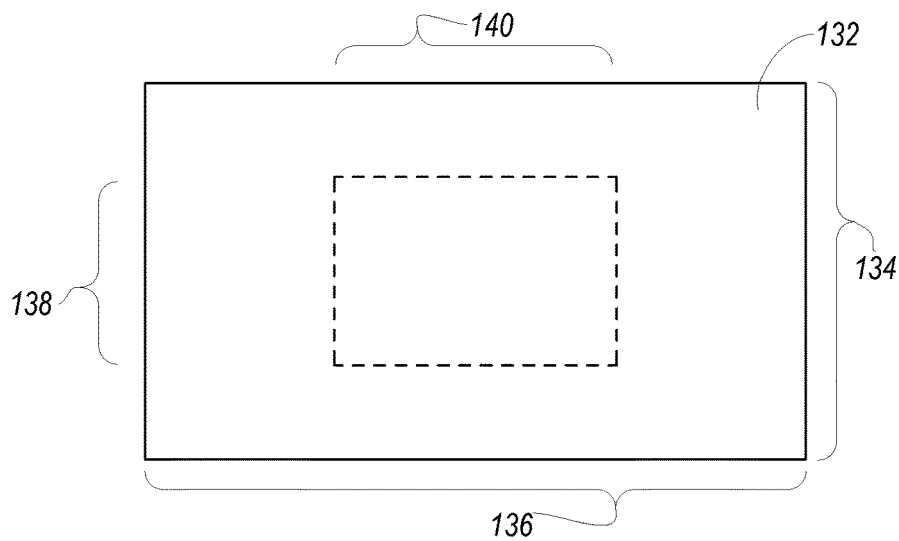
FIG. 4 is a comparison of a cropped region of an imaging sensor in a conventional long throw imaging mode to an active area of the 3D TOF imaging system of FIG. 1 in a long throw imaging mode.

FIG. 4 illustrates an embodiment of a photoreceptor array 132 that may be used in the imaging sensor. In some embodiments, the photoreceptor array 132 is a complimentary metal-oxide semiconductor (CMOS) sensor. In other embodiments, the photoreceptor array 132 is a charge coupled device (CCD).

The photoreceptor array 132 has a height 134 and a width 136 of the active area. In conventional long throw systems, a cropped subsection of the photoreceptor array 132 having a reduced height 138 and reduced width 140 is used to image the smaller angular space that is illuminated by the illuminator. For example, in some conventional systems, the FOV is cropped from 512×512 down to 320×288, a >60% reduction in overall resolution. Using a portion of the photoreceptor array 132 that is less than the full height 134 and width 136 of the active area limits the angular resolution of the 3D imaging system and the associated optics. In some embodiments according to the present disclosure, adjustable optics may allow for the imaging sensor to image input light with substantially all of the height 134 and width 136 of the photoreceptor array 132. For example, the adjustable optics of the illuminator and imaging sensor may allow for the imaging sensor to selectively receive input light from only the portion of the environment illuminated by the illuminator, while receiving input with substantially the entire active area of the photoreceptor array 132.

Figures 1, 5:
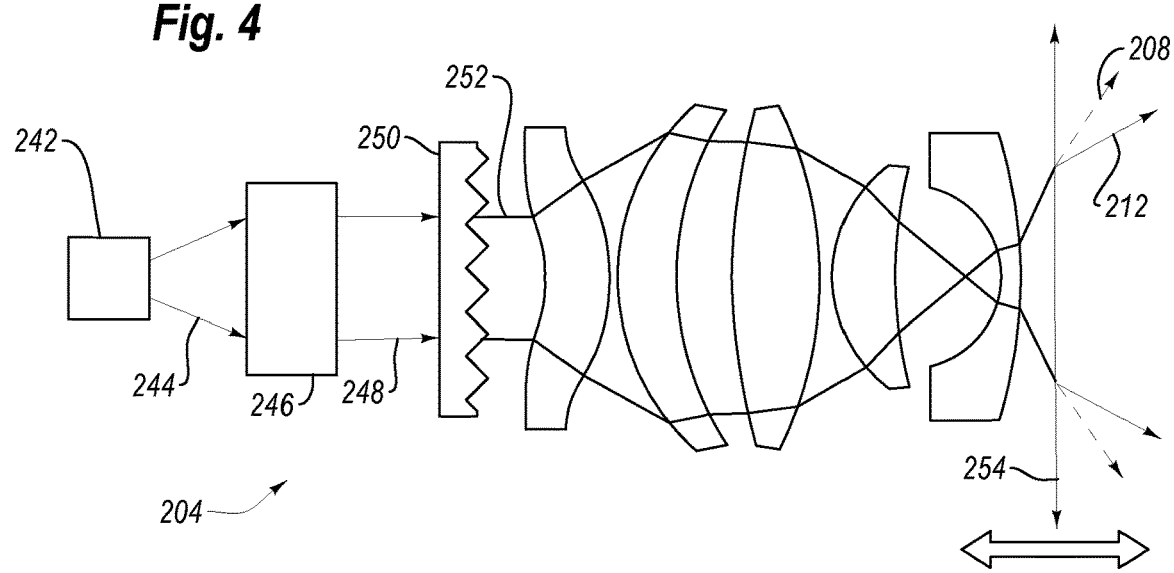
Figures 2, 5:
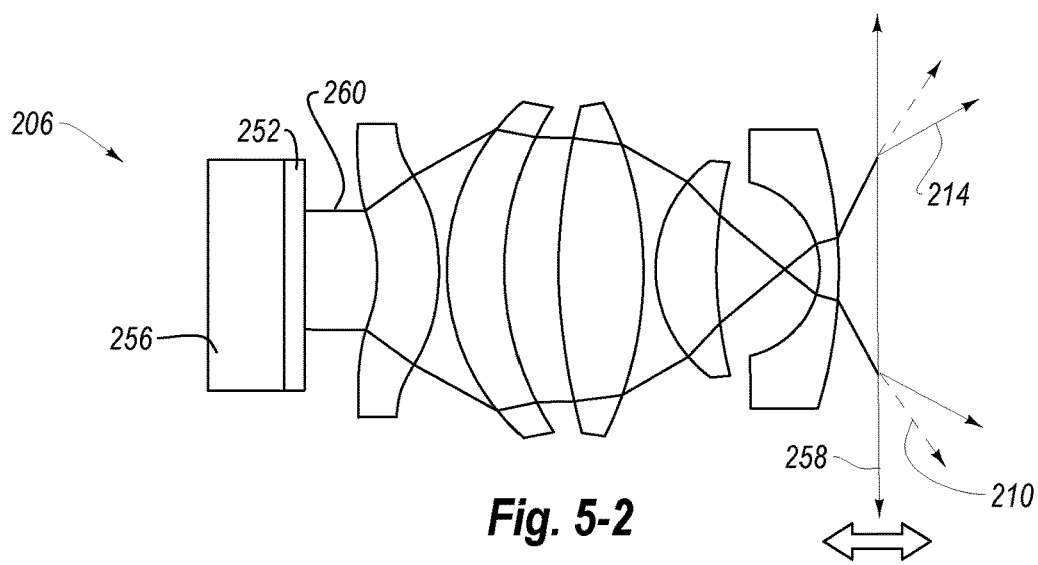

FIG. 5-1 and FIG. 5-2 schematically illustrate an embodiment of the adjustable optics of a 3D imaging system. FIG. 5-1 illustrates the adjustable optics of an illuminator 204. The illuminator 204 includes a light source 242 that produces an emitted light 244. The emitted light 244 is collimated by a collimator 246 into a collimated light 248, which, in turn, passes to a beam broadener 250, such as a diffuser. The diffused light 252 may then be directed by a movable illuminator lens 254. The movable illuminator lens 254 may be moved axially (i.e., relative to the light source 242) to change the angle of the FOI of an output light from the short throw FOI 208 to the long throw FOI 212, or any FOI therebetween.

In other embodiments, the illuminator 204 includes a plurality of movable illuminator lenses to alter the FOI of the illuminator 204. For example, the illuminator 204 may include a lens stack including a plurality of lenses where the lens stack is movable as set. In other examples, the illuminator 204 may include a plurality of movable illuminator lenses 254 that are independently moveable relative to the light source 242.

In some embodiments, the movable illuminator lens 254 includes or is made of glass. A glass lens may experience less change in optics due to thermal effects during use than a polymer lens or other material. In other embodiments, at least one of the collimator, diffuser, and illuminator lens 254 includes or is made of a poly acrylic, polycarbonate, or other material.

FIG. 5-2 is a schematic representation of adjustable optics of an imaging sensor 206, according to the present disclosure. In some embodiments, the imaging sensor 206 includes at least a photoreceptor 256 and one or more movable imaging lenses 258. In other embodiments, the imaging sensor 206 may include additional lenses positioned between the one or more movable imaging lenses 258.

In some embodiments, the imaging sensor 206 includes bandpass filter 252 configured to attenuate light outside of the first wavelength range, described in relation to FIG. 1. For example, light may be received by the one or more movable imaging lenses 258, and the focused light 260 may be directed toward the bandpass filter 252 positioned proximate the photoreceptor 256. The bandpass filter 252 may transmit more light in the first wavelength range than light outside the first wavelength range. For example, the focused light 260 approaching the bandpass filter 252 may include reflected light from the illuminator in the first wavelength range, as well as ambient light. The bandpass filter 252 may attenuate at least part of the ambient light portion to increase the relative proportion of reflected light from the illuminator in the incoming light.

The movable imaging lens 258 may be moved axially (i.e., relative to the photoreceptor 256) to change the angle of the FOV of an input light from the short throw FOV 210 to the long throw FOV 214, or any FOV therebetween.

In other embodiments, the imaging sensor 206 includes a plurality of movable imaging lenses 258 to alter the FOV of the imaging sensor 206. For example, the imaging sensor 206 may include a lens stack including a plurality of lenses where the lens stack is movable as set. In other examples, the imaging sensor 206 may include a plurality of movable imaging lenses 258 that are independently moveable relative to the photoreceptor 256.

In some embodiments, the movable imaging lens 258 includes or is made of glass. A glass lens may experience less change in optics due to thermal effects during use than a polymer lens or other material. In other embodiments, the imaging lens 258 includes or is made of a poly acrylic, polycarbonate, or other material.

Figure 6:
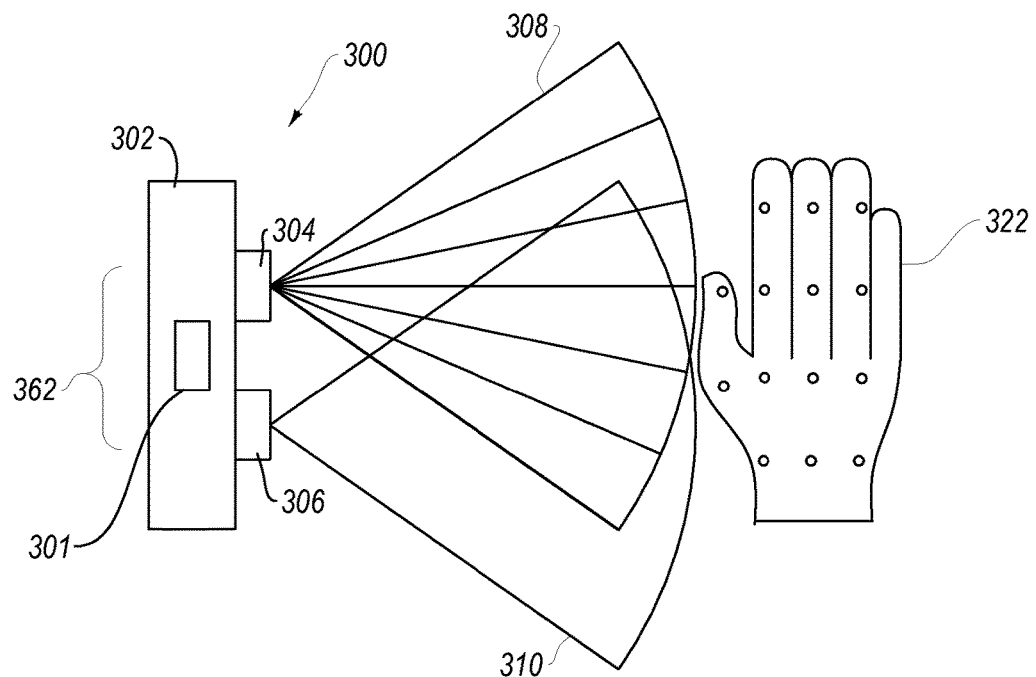
FIG. 6 is a schematic representation of a 3D structured light imaging system in a short throw imaging mode.

FIG. 6 illustrates another embodiment of a 3D imaging system 300 according to the present disclosure. In some embodiments, the 3D imaging system 300 includes a structured light illuminator 304 to provide a known pattern of illumination to a target or object 322 in the environment. The 3D imaging system 300 may include a housing 302 that includes a processor 301 in data communication with the structured light illuminator 304 and an imaging sensor 306. The processor 301 may receive image information from the imaging sensor 306 to calculate depth of the image information.

FIG. 6 illustrates the 3D imaging system 300 in a short range operation. The structured light illuminator 304 is operating with a short throw FOI 308 to project a pattern of structured light onto the object 322. In the illustrated example, the object is a user's hand for gesture tracking. The imaging sensor 306 may receive light from at least part of the pattern of structured light within the short throw FOV 310. The received light from the pattern of structured light may be used by the processor 306 to determine any shift or displacement in the pattern. The shift or displacement may be used to calculate the depth of the object 322 imaged.

The measured shift or displacement of the projected pattern may be at least partially dependent upon the displacement 362 of the structured light illuminator 304 and the imaging sensor 306. In some embodiments, the displacement 362 is in a range having an upper value, a lower value, or upper and lower values including any of 0.5 cm, 1.0 cm, 2.0 cm, 3.0 cm, 4.0 cm, 5.0 cm, 6.0 cm, 7.0 cm, 8.0 cm, 9.0 cm, 10 cm, 15 cm, 20 cm, 30 cm, 40 cm, 50 cm, 1.0 m, or any values therebetween. For example, the displacement 362 may be greater than 0.5 cm. In other examples, the displacement 362 may be less than 1.0 m. In yet other examples, the displacement 362 may be between 0.5 cm and 1.0 m. In further examples, the displacement 362 may be between 1.0 cm and 10 cm.

The 3D imaging system 300 of FIG. 6 may have a short throw FOI 308 and short throw FOV 310 with dimensions such as those described in relation to the short throw FOI 108 and short throw FOV 110 described in relation to FIG. 1 through FIG. 2. Additionally, the 3D imaging system 300 of FIG. 6 is illustrated in a long throw operational mode in FIG. 7, and the long throw FOI 312 and long throw FOV 314 of FIG. 7 may have dimensions similar to the long throw FOI 112 and long throw FOV 114 described in relation to FIG. 1 and FIG. 3.

The 3D imaging of a long range object 324 with a structured light illuminator 304 may be at least partially dependent on the density of the structured light pattern projected on the object 324 and the FOV and/or resolution of the sensor 306. In a conventional system, the pattern diverges and the spatial resolution of the structured light pattern degrades. By narrowing the FOI from the short throw FOI 308 in FIG. 6 to the long throw FOI 312 shown in FIG. 7, the density of the structured light pattern is maintained over a longer distance.

Figure 7:
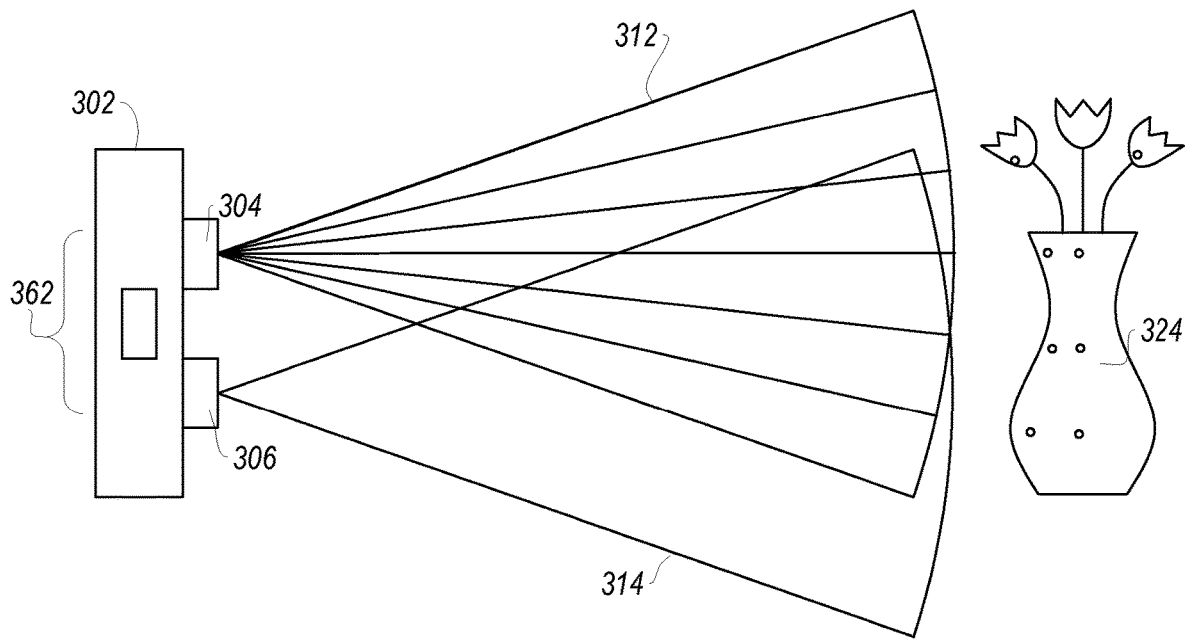
FIG. 7 is a schematic representation of the 3D structured light imaging system of FIG. 6 in a long throw imaging mode.

To precisely measure the location and any shift and/or displacement of the structured light pattern, the imaging sensor 306 may be adjusted to narrow the FOV to the long throw FOV 314 shown in FIG. 7. The long throw FOV 314 may allow for a higher angular resolution of the imaging sensor 306 to more precisely measure changes in the structured light pattern, improving depth calculations.

Figure 8:
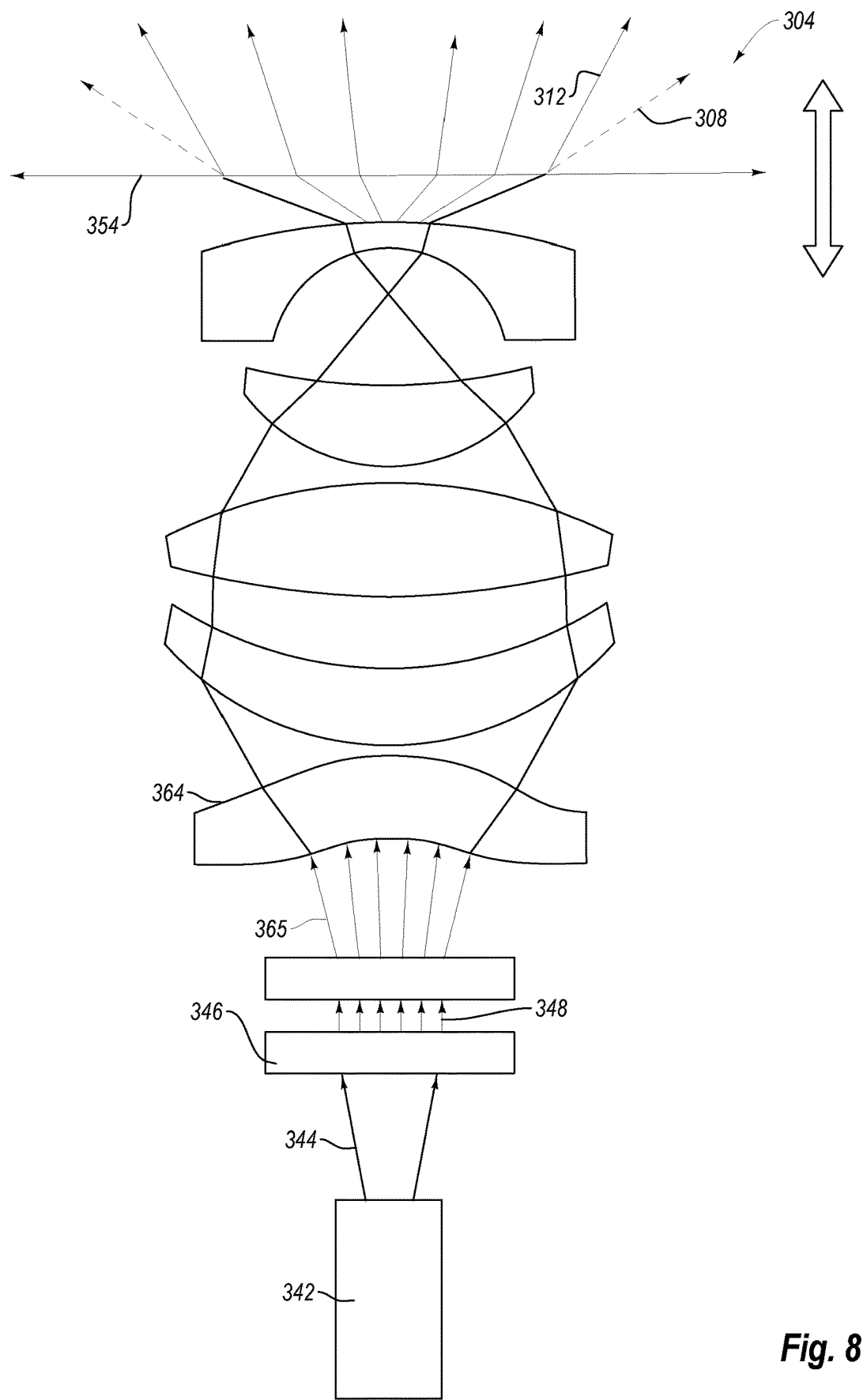
FIG. 8 is a schematic representation of a structured light illuminator with adjustable optics.

FIG. 8 illustrates a schematic representation of an embodiment of adjustable optics in a structured light illuminator 304 according to the present disclosure. The structured light illuminator 304 includes a light source 342 that produces an emitted light 344. The emitted light 344 is collimated by a collimator 346 into a collimated light 348, which, in turn, passes to a structured light optical element 364, such as a diffraction grating, to produce the structured light 365. The structured light 365 may then be directed by a movable illuminator lens 354. The movable illuminator lens 354 may be moved axially (i.e., relative to the light source 342) to change the angle of the FOI of an output light from the short throw FOI 308 to the long throw FOI 312, or any FOI therebetween.

FIG. 9 through FIG. 12 illustrate 3D imaging systems 400, 500 that include a plurality of imaging sensors configured to measure disparity of an object within the FOV of the first imaging sensor and the FOV of the second imaging sensor. The stereoscopic vision of the plurality of imaging sensors uses triangulation to determine depth values. A stereoscopic 3D imaging system may utilize active illumination from an illuminator in the 3D imaging system and/or use passive illumination from ambient light. Stereoscopic vision, therefore, may be used in outdoor applications with less concern for interference or noise introduced by ambient light, such as sunlight.

Optionally, an active illuminator 404 may be used to provide additional "texture" to the environment to assist in stereoscopic depth measurements. For example, some environments or object may have little to no texture on a surface. Detecting and measuring any disparity in between the two or more imaging sensors of the 3D imaging system may be difficult in such environments. An active illuminator may provide some variation across the surface to enhance contrast.

Figure 9:
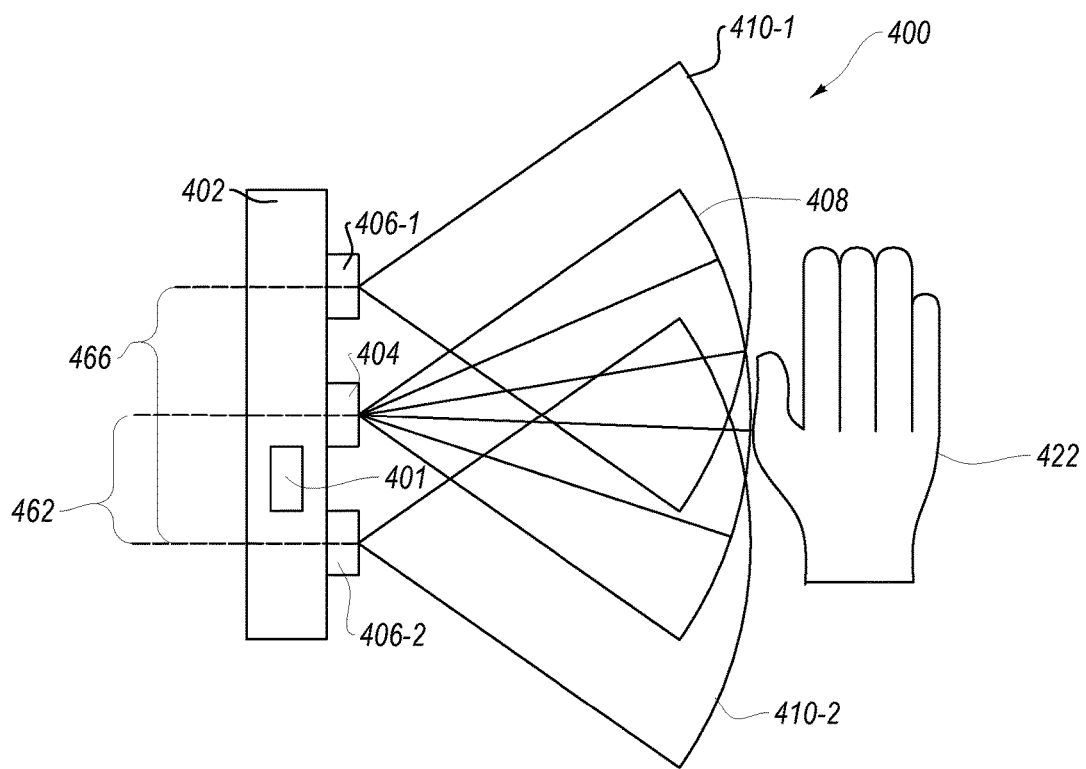
FIG. 9 is a schematic representation of a 3D active stereoscopic imaging system in a short throw imaging mode.

In a stereoscopic 3D imaging system, such as that shown in FIG. 9, a displacement 462 of the illuminator 404 and the imaging sensor 406-1, 406-2 may allow for improved detecting of low contrast surfaces. In other applications, a high contrast object 422, such as the hand shown in FIG. 9, may be detected more precisely in environments with low amounts of ambient illumination. A 3D imaging system 400 with a plurality of imaging sensors 406-1, 406-2 and an active illuminator 404 may selectively run the illuminator 404 when beneficial, while saving the power when in an environment with sufficient ambient lighting.

Figure 10:
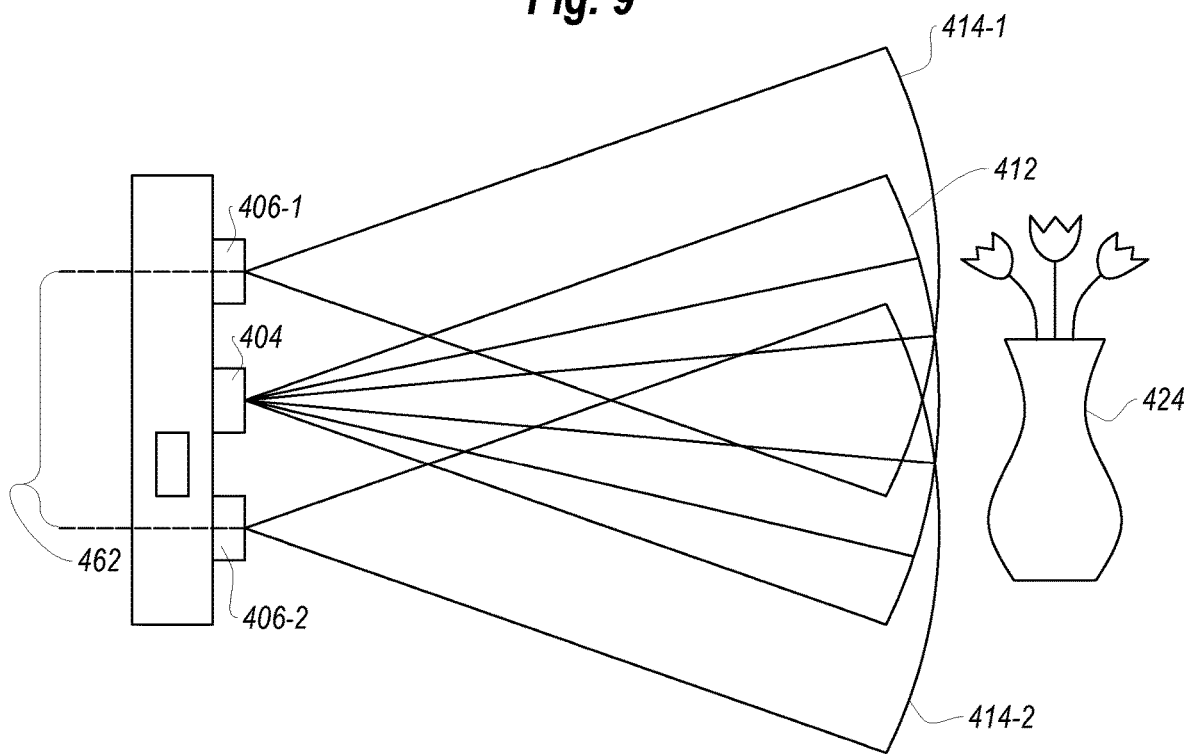
FIG. 10 is a schematic representation of the 3D active stereoscopic imaging system of FIG. 9 in a long throw imaging mode.

Similarly to the active illuminators described herein, the illuminator 404 have a variable focal length to adapt the FOI between the short throw FOI 408 illustrated in FIG. 9 and the long throw FOI 412 illustrated in FIG. 10 to provide tailored illumination in aiding the stereoscopic depth measurements.

The housing 402 of the 3D imaging system 400 may be substantially rigid housing or otherwise restrict the movement of the first imaging sensor 406-1 and second imaging sensor 406-2 relative to one another. The distance between the first imaging sensor 406-1 and second imaging sensor 406-2 may, therefore, be a fixed baseline 466. The precision of the depth measurements of the stereoscopic 3D imaging system 400 is related to the baseline 466 by:

$$\text{Average Bias Error} = \text{mean}\left(\text{Lens } EFL * \frac{\text{Baseline}}{\text{Estimated disparity}}\right) - \text{radial depth}$$

where the lens EFL is the effective focal length. The precision of the system therefore, can be improved by tailoring the focal length (and hence the FOV) of the imaging sensors 406-1, 406-2, to the depth of the object 422.

The focal length of the imaging sensors 406-1, 406-2 may be changed as described in relation to FIG. 5-2 between the short throw FOV 410-1, 410-2 and the long throw FOV 414-1, 414-2 illustrated in FIG. 9 and FIG. 10. The FOV of the first imaging sensor 406-1 and the second imaging sensor 406-2 may be fixed relative to one another. For example, the first imaging sensor 406-1 and the second imaging sensor 406-2 may both have a short throw FOV 410-1, 410-2 at the same time and may change focal length together as the first imaging sensor 406-1 and the second imaging sensor 406-2 change toward a long throw FOV 414-1, 414-2 to image the distance object 424 illustrated in FIG. 10. Having the focal length of the first imaging sensor 406-1 and the second imaging sensor 406-2 tied to one another may ensure that any image comparison performed by a processor 401 may be performed with images of the same FOV.

Figure 11:
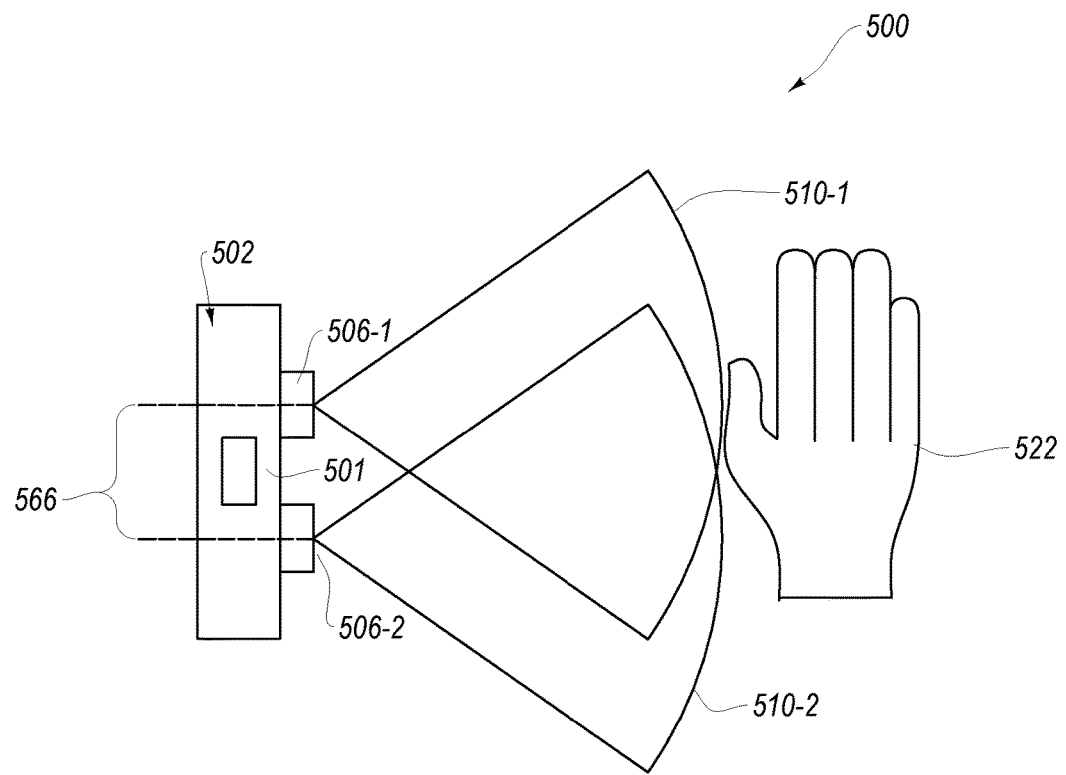
FIG. 11 is a schematic representation of a 3D passive stereoscopic imaging system in a short throw imaging mode.
Figure 12:
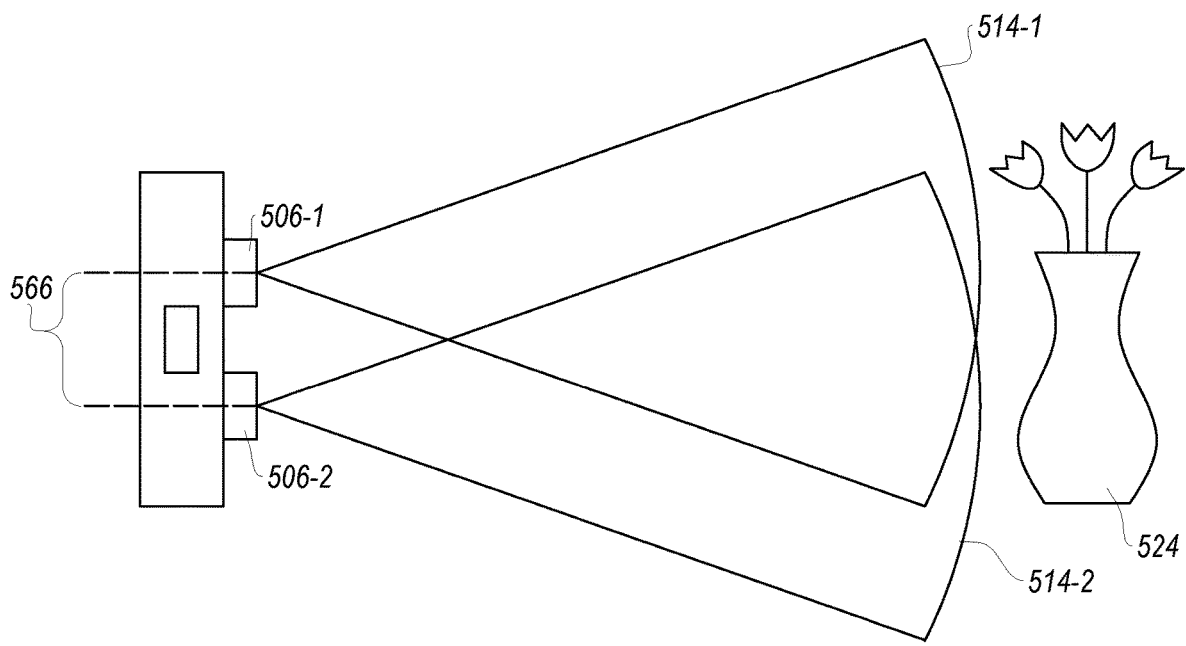
FIG. 12 is a schematic representation of the 3D passive stereoscopic imaging system of FIG. 11 in a long throw imaging mode.

In other embodiments, the 3D imaging system is a fully passively illuminated system, such as the 3D imaging system 500 illustrated in FIG. 11 and FIG. 12. The first imaging sensor 506-1 is continuously adjustable from a short throw FOV 510-1 for close depth measurements and tracking of an object 522 shown in FIG. 11 to a long throw FOV 514-1 shown in FIG. 12 for ranged depth measurements and tracking of an object 524. The second imaging sensor 506-2 is continuously adjustable from a short throw FOV 510-2 shown in FIG. 11 to a long throw FOV 514-2 shown in FIG. 12.

Because the housing 502 is a fixed housing, the baseline 566 remains constant between operating distances. As described in relation to FIG. 9 and FIG. 10, the focal length of the first imaging sensor 506-1 and the focal length of the second imaging sensor 506-2 may be fixed relative to one another, such that any images communicated to the processor 501 are of the same FOV, irrespective of the focal length.

Adjusting the FOI and/or FOV of a 3D imaging system may have further benefits, as well. For example, conventional 3D imaging systems with active illumination encounter uncertainty in depth calculations near sidewalls of a room or object because active illumination can follow multiple paths to or from an imaged point.

Figure 13:
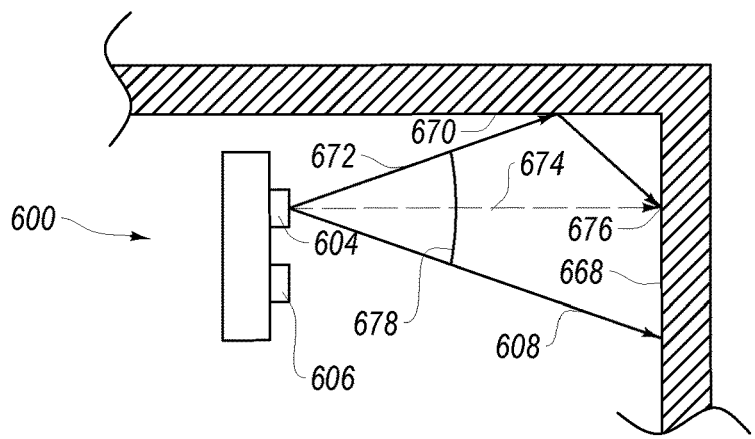
FIG. 13 is a schematic representation of a 3D imaging system with an illuminator with adjustable optics encountering a multipath error.

FIG. 13 illustrates such a "multipath" situation, wherein a 3D imaging system 600 with an illuminator 604 and an imaging sensor 606 may experience uncertainty. The 3D imaging system 600 is attempting to image an endwall 668 of a room near a sidewall 670. The wide-angle short throw FOI 608 has diverging light 672 centered about a center axis 674. In the illustrated example, the diverging light 672 may reflect from the sidewall 670 and converge at a common point 676 with the center axis 674. In a 3D imaging system 600 with active illumination (either a time-of-flight 3D imaging system or a structured light 3D imaging system), having multiple paths of different lengths converging at a common point 676 will introduce error. A 3D imaging system with adjustable FOI and/or FOV, however, may alter the first angular width 678 relative to the center axis 676 of the FOI and/or FOV to avoid illuminating the sidewall 670.

Figure 14:
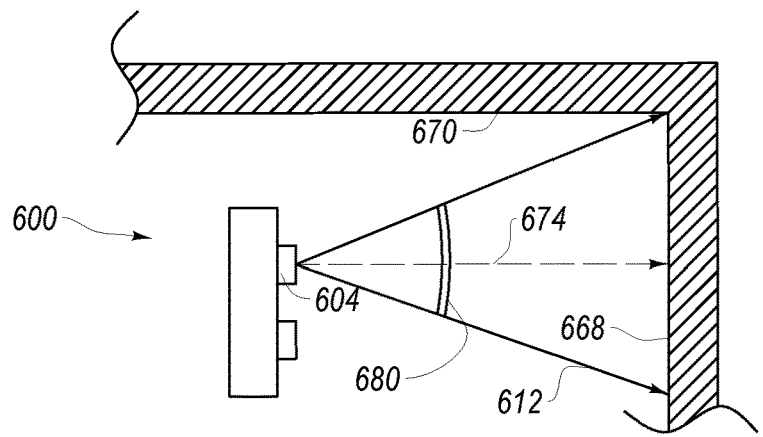
FIG. 14 is a schematic representation of the 3D imaging system of FIG. 13 in a long throw operating mode to avoid the multipath error.

FIG. 14 illustrates the 3D imaging system 600 of FIG. 13 with a narrower second angular width 680 relative to the center axis 676 in the long throw FOI 612. The focal length of the illuminator 604 may be altered to reduce the lateral dimension of the FOI and prevent illumination of the sidewall, such that all output light from the illuminator 604 contacts the endwall 668 first. By aligning the FOI and the FOV, as described above, the FOV may further avoid capturing light reflected from the sidewall after encountering the endwall (e.g., the multipath of FIG. 13 in reverse). FIG. 14 illustrates a long throw FOI 612 that is narrower than the short throw FOI 608 of FIG. 13. Both the long throw FOI 612 and the short throw FOI 608 are centered about the center axis 674.

Figure 15:
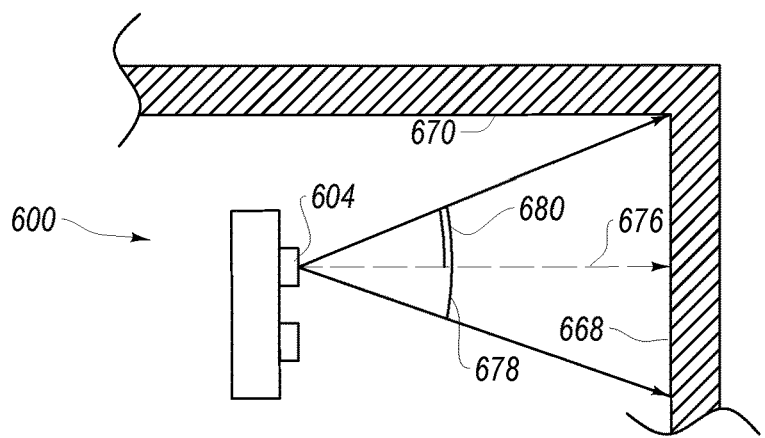
FIG. 15 is a schematic representation of the 3D imaging system of FIG. 13 with a partially blocked illuminator to avoid the multipath error.

FIG. 15 illustrates another example of avoiding a multipath situation with a 3D imaging system 600 with adjustable optics. The illuminator 604 may have an aperture thereon that is movable laterally to bias the FOI in a lateral direction. While the center axis 676 may remain substantially normal to the endwall 668, the portion of the FOI proximate the sidewall 670 may be partially eclipsed such that the portion of the FOI proximate the sidewall 670 effectively has the narrower second angular width 680 relative to the center axis 676. The portion of the FOI farther from the sidewall 670 may be unaltered, and the portion of the FOI farther the sidewall 670 may have the wider first angular width 678.

Similarly, conventional 3D imaging systems experience uncertainty at increasing distances relative to the angular FOV. The standard deviation in such uncertainty is commonly referred to as "jitter" because the uncertainty can result in depth calculations that vary along a known flat surface. Jitter is primarily caused by the worsening angular resolution of a 3D imaging system as the depth of field increases. The effective area that is represented by each pixel becomes larger and the depth calculations for that particular area can become uncertain. A 3D imaging system with adjustable optics, according to the present disclosure, may lessen jitter uncertainty. For example, in simulations conducted for a passive stereoscopic 3D imaging system with a baseline of 40 mm and an imaging sensor resolution of 1024 by 1024 pixels, a 65° FOV yielded reasonable jitter and reliable depth calculations up to 1.0 meter of depth (i.e., less than 15 mm of jitter). However, farther than 1 meter, the jitter renders the system unreliable. Reducing the FOV to about 20° while keeping the baseline constant allows the system to reliable calculate depth measurements up to 2.0 meter of depth before experiencing an equivalent jitter of 15 mm.

In any of the embodiments of a 3D imaging system with adjustable optics, the system will be calibrated at a plurality of distances to accurately measure depth of the image while factoring for intrinsic parameters and geometric distortion. In some embodiments, the 3D imaging system is calibrated by measuring the geometric distortion at different effective focal lengths to allow the system to compensate for the changes in optical behavior with changes to the optics. In other embodiments, the 3D imaging system is calibrated by machine learning. A known object or target may be positioned at a known relationship to the 3D imaging system and the dimensions and/or position of the object may be provided to the 3D imaging system. The process is repeated at different positions relative to the 3D imaging system and the 3D imaging system (e.g., the processor) may infer the appropriate corrections to correlate the provided known values as the object is moved.

Figure 16:
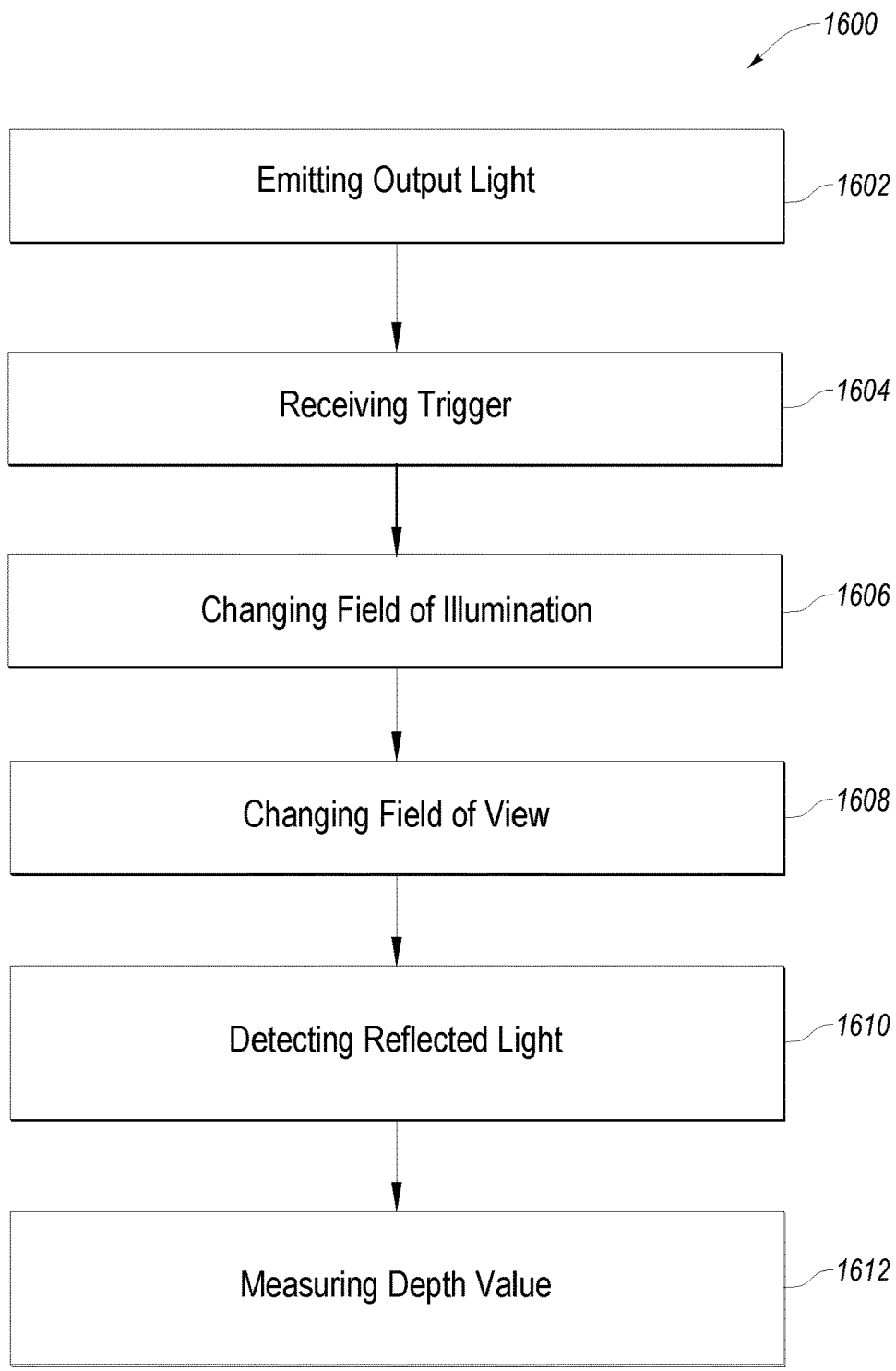
FIG. 16 is a flowchart illustrating a method of 3D imaging with a 3D imaging system according to the present disclosure including an active illuminator.

The adjustments to the optics of a 3D imaging system (e.g., changing FOI, changing FOV, or both) may be performed manually by a user or made automatically in response to one or more triggers. For example, FIG. 16 illustrates a flowchart 1600 depicting a method of 3D imaging using adjustable optics.

The method may include emitting an output light from an illuminator at 1602 to illuminate a target or an environment. Upon receiving a trigger at 1604, the system may change the field of illumination of an illuminator at 1606 and/or the field of view of an imaging sensor at 1608.

In some embodiments, the trigger is provided by the 3D imaging system, itself. For example, the trigger may be the calculation of a jitter value above a predetermined threshold (e.g., 30 mm of jitter). In another example, the trigger may be detection uncertainty that may be due to a multipath error. In yet another example, the trigger may be the detection of a close-range object moving through the FOV rapidly (e.g., a hand gesture that a narrow FOV only partially captures).

In other embodiments, the trigger is provided by a software application in communication with the 3D imaging system. For example, when the 3D imaging system is used in a head mounted device, a software application for displaying interactive models to a user may instruct the 3D imaging system to decrease the effective focal length of the imaging sensor(s) to increase hand tracking for interacting with the models. In another example, with the 3D imaging system is used in video conferencing system, a software application may be set to a "room" mode to instruct the 3D imaging system to increase the focal length to image objects all the way at an opposite wall of the room.

In yet other embodiments, the trigger is received from one or more sensors in data communication with the 3D imaging system. For example, the trigger may be received from an ambient light sensor, instructing the 3D imaging system to narrow the FOI and/or FOV to increase illumination concentration and angular resolution in an effort to compensate for high amounts of ambient light. In other examples, such as when the 3D imaging system used in or on a vehicle, an accelerometer, GPS sensor, speedometer, or other movement tracking device may instruct the 3D imaging system to either narrow or broaden the FOI and/or FOV depending at least partially upon velocity and/or acceleration of the 3D imaging system.

Upon receiving changing the field of illumination and/or changing the field of view, the system may detect reflected light at 1610 including at least part of the output light of the illuminator and measure one or more a depth values of the FOV at 1612 based upon the time-of-flight, the distortion and/or shift of the structured light, or the disparity in images (when the 3D imaging system has a plurality of imaging sensors).

Figure 17:
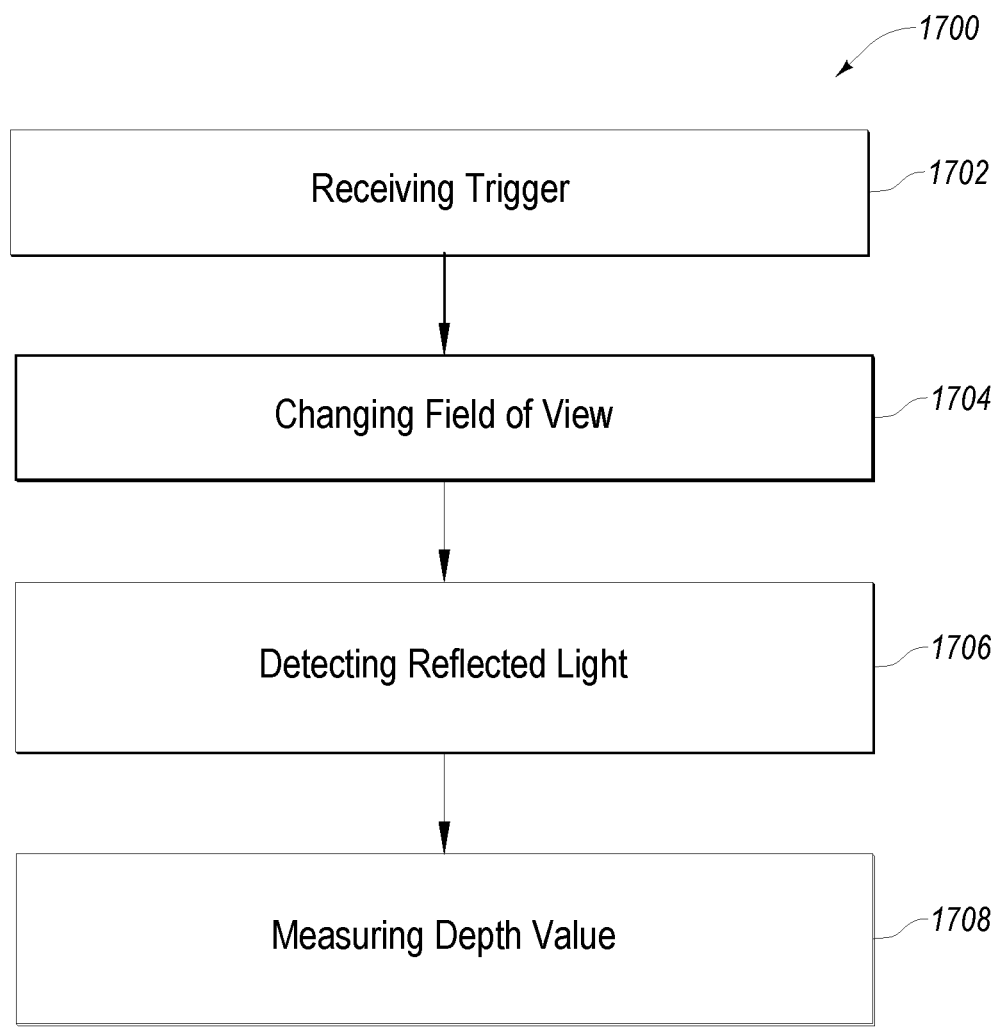
FIG. 17 is a flowchart illustrating a method of 3D imaging with a 3D imaging system according to the present disclosure with passive illumination.

FIG. 17 is a flowchart 1700 illustrating an embodiment of a method of 3D imaging using a passive stereoscopic system. The method includes receiving a trigger at 1702, such as any of the triggers described above, and changing the field of view of a first imaging sensor and a second imaging sensor at 1704. After changing the field of view, the method includes detecting reflected light at 1706 with a first imaging sensor and a second imaging sensor and measuring at least one depth value of the images collected at 1708 by comparing the signal from the first imaging sensor and the signal from the second imaging sensor.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of three-dimensional imaging, the method including:
   receiving a trigger command;
   in response to the trigger command, changing a field of view of a first imaging sensor and a second imaging sensor by moving one or more movable imaging lenses positioned proximate an input of the imaging sensor and movable relative to a photoreceptor of the imaging sensor, wherein the one or more movable imaging lenses are configured to vary a field of view of each imaging sensor such that a first field of view of the first imaging sensor and a second field of view of the second imaging sensor are fixed relative to one another;
   detecting a reflected light with the first imaging sensor and the second imaging sensor; and
   measuring a depth value by comparing information from the first imaging sensor and the second imaging sensor to calculate a stereoscopic depth measurement from a disparity of a first image from the first imaging sensor and a second image from the second imaging sensor.

2. The method of claim 1, wherein the trigger command is received from a software application.

3. The method of claim 1, wherein the trigger command is a calculation of a jitter value above a predetermined threshold.

4. The method of claim 1, wherein the trigger command is at least partially based on environmental information.

5. The method of claim 1, further comprising emitting an output light with an illuminator.

6. The method of claim 5, further comprising, in response to the trigger command, changing a field of illumination of the illuminator.

7. The method of claim 6, wherein changing the field of illumination of the illuminator includes moving one or more movable illuminator lenses positioned proximate an output of the illuminator and movable relative to the output of the illuminator.

8. The method of claim 7, wherein the one or more movable illuminator lenses are configured to vary the field of illumination such that the field of illumination and the first field of view of the first imaging sensor and the second field of view of the second imaging sensor are fixed relative to one another.

9. The method of claim 1, wherein the first field of view and second field of view have a short throw field of view and a long throw field of view and the short throw field of views overlap by at least 95% and the long throw field of views overlap by at least 95%.

10. The method of claim 1, wherein the first field of view is adjustable between 30° and 120°.

11. The device of claim 1, wherein the second field of view is adjustable between 30° and 120°.

12. A method of three-dimensional imaging, the method including:
    receiving a trigger command;
    in response to the trigger command, changing a field of view of a first imaging sensor and a second imaging sensor by moving one or more movable imaging lenses positioned proximate an input of the imaging sensor and movable relative to a photoreceptor of the imaging sensor, wherein the one or more movable imaging lenses are configured to vary a field of view of each imaging sensor such that a first field of view of the first imaging sensor and a second field of view of the second imaging sensor are fixed relative to one another;
    attenuating a portion of a reflected light with a bandpass filter to create a filtered light;
    detecting the filtered light with the first imaging sensor and the second imaging sensor; and
    measuring a depth value by comparing information from the first imaging sensor and the second imaging sensor to calculate a stereoscopic depth measurement from a disparity of a first image from the first imaging sensor and a second image from the second imaging sensor.

13. The method of claim 12, the bandpass filter configured to attenuate the portion of the reflected light outside of a first wavelength range.

14. The method of claim 13, the first wavelength range being in the infrared wavelength range.

15. The method of claim 11, further comprising, in response to the trigger command, changing a field of illumination of an illuminator.

16. The method of claim 15, wherein changing the field of illumination of the illuminator includes moving one or more movable illuminator lenses positioned proximate an output of the illuminator and movable relative to the output of the illuminator.

17. The method of claim 16, wherein the one or more movable illuminator lenses are configured to vary the field of illumination such that the field of illumination and the first field of view of the first imaging sensor and the second field of view of the second imaging sensor are fixed relative to one another.

18. The method of claim 11, wherein the first field of view and second field of view have a short throw field of view and a long throw field of view and the short throw field of views overlap by at least 95% and the long throw field of views overlap by at least 95%.

19. A method of three-dimensional imaging, the method including:
   emitting an output light in a first wavelength range with an illuminator;
   receiving a trigger command;
   in response to the trigger command, changing a field of illumination of the illuminator, wherein changing the field of illumination of the illuminator includes moving one or more movable illuminator lenses positioned proximate an output of the illuminator and movable relative to the output of the illuminator, and the one or more movable illuminator lenses are configured to vary the field of illumination such that the field of illumination and the first field of view of the first imaging sensor and the second field of view of the second imaging sensor are fixed relative to one another;
   in response to the trigger command, changing a field of view of a first imaging sensor and a second imaging sensor by moving one or more movable imaging lenses positioned proximate an input of the imaging sensor and movable relative to a photoreceptor of the imaging sensor, wherein the one or more movable imaging lenses are configured to vary a field of view of each imaging sensor such that a first field of view of the first imaging sensor and a second field of view of the second imaging sensor are fixed relative to one another;
   attenuating a portion of a reflected light with a bandpass filter outside of the first wavelength range to create a filtered light;
   detecting the filtered light with the first imaging sensor and the second imaging sensor; and
   measuring a depth value by comparing information from the first imaging sensor and the second imaging sensor to calculate a stereoscopic depth measurement from a disparity of the first image from the first imaging sensor and the second image from the second imaging sensor.

20. The method of claim 19, wherein the first wavelength range is in a range of 800 nanometers (nm) to 1000 nm.

* * * * *